S. CONSIGLIERE.
PRODUCTION OF METALLIC BODIES BY MEANS OF ELECTRODEPOSITION.
APPLICATION FILED SEPT. 2, 1910.

1,051,556.

Patented Jan. 28, 1913.

S. CONSIGLIERE.
PRODUCTION OF METALLIC BODIES BY MEANS OF ELECTRODEPOSITION.
APPLICATION FILED SEPT. 2, 1910.

1,051,556.

Patented Jan. 28, 1913.

2 SHEETS—SHEET 2.

WITNESSES:
J. F. Wallace
René Buine

INVENTOR:
Stefano Consigliere
By Attorneys,
Fraser, Turk & Myers

UNITED STATES PATENT OFFICE.

STEFANO CONSIGLIERE, OF GENOA, ITALY.

PRODUCTION OF METALLIC BODIES BY MEANS OF ELECTRODEPOSITION.

1,051,556. Specification of Letters Patent. Patented Jan. 28, 1913.

Application filed September 2, 1910. Serial No. 580,264.

*To all whom it may concern:*

Be it known that I, STEFANO CONSIGLIERE, engineer, of Genoa, Italy, having invented certain new and useful Improvements in the Production of Metallic Bodies by Means of Electrodeposition, do hereby declare that the following is a full, clear, and exact description thereof.

The invention relates to improvements in electroplating, whereby metallic bodies of compact and non-porous metal deposit may be directly obtained by means of the electro-deposition process, which metallic bodies may be of any desired shape, solid or hollow, and capable of supporting high interior or exterior pressures, and without its being necessary that the surface of the proposed bodies be a regular one or one having a revolving surface.

The leading feature of the invention is the employment of a suitable number of movable small bodies, which may be free or connected together in series according to requirements, preferably of spherical or rounded form, and hard, electrically non-conductors, and of suitable size and appreciable weight, such as glass or porcelain balls, ordinary pebbles, or the like, said bodies being put in continuous or intermitted movement inside the liquid of the bath, so as to beat and roll on the surface of the mold on which the metallic layer is being deposited or has already been deposited, and all this with or without interruption of the electrical current. The movement of said hard, relatively heavy bodies on the surface of the mold may be obtained in different ways, by means of rotation or oscillation, or a combination of rotation and oscillation of the vessel or drum containing the electrolytic bath, the object used as a mold (whose surface, in consequence of its nature or of a suitable preparation has electrically good conducting surface), being mounted inside the said vessel or drum, in which, besides the liquid of the bath, is placed a suitable quantity of said hard, relatively heavy and electrically non-conducting bodies, free or connected together in series. The said vessel or drum may then be set in rotation or oscillation on suitable bearings.

Figure 1:
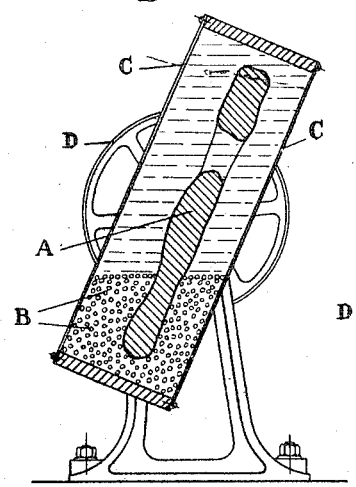
Figure 2:
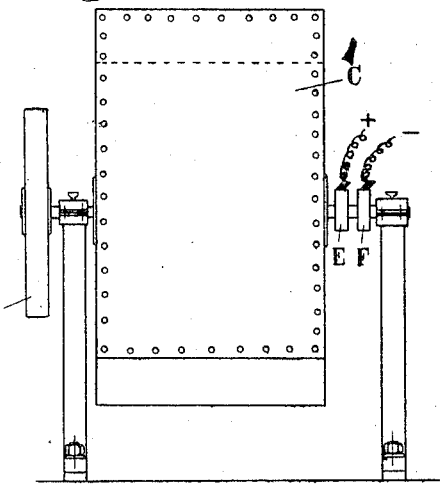
Figure 3:
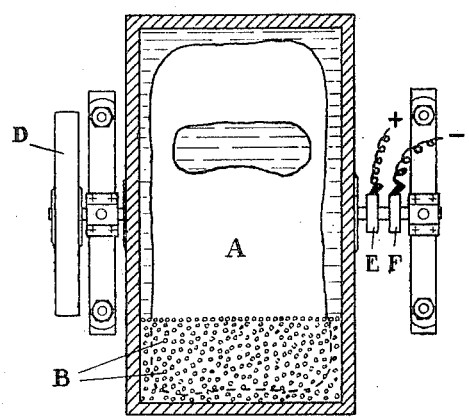
Figure 4:
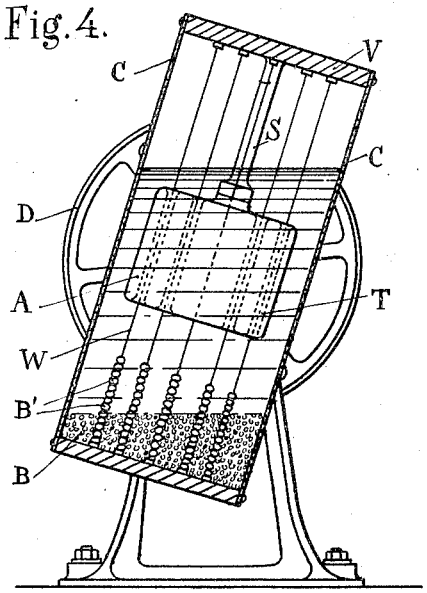
Figure 5:
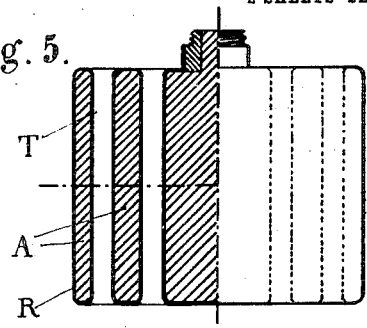
Figure 6:
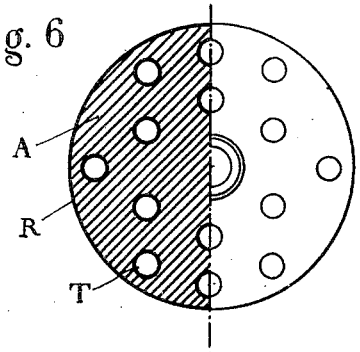

The invention may be carried out in the apparatus illustrated in the accompanying drawings, in which:

Figure 1 is a sectional view of said apparatus, the section being perpendicular to the axis of rotation; Fig. 2 is a front elevation; Fig. 3 is a section passing through the axis of rotation; Fig. 4 is a sectional elevation of the apparatus adapted to operate on a different form of mold; Fig. 5 is an enlarged elevation of the mold A partially sectioned in order to show the layer R of compact metal deposited on the surface of the mold and especially on the interior of the tubes T. Fig. 6 is a plan view and section of the said mold.

Like characters of reference indicate like parts throughout the views, in which:

A is the body or mold on whose surface the metallic coating is to be applied by electro-deposition, which may be of such material that it may be totally or partially removed at the end of the process in order to produce hollow deposit metal bodies. If desired, more than one body or mold may be operated upon at the same time. B, B indicate the hard, relatively heavy bodies, which may be free or connected together in series which, during the continuous, or suitably interrupted, rotation or oscillation of the vessel or drum, in consequence of their rolling and beating on the surface of the said mold, hammer or beat upon the metallic coating being deposited on the surface of the mold A, or already deposited on it, rendering the said metallic coating more compact and resistant.

C, C are the anodes, constituted by the same metal that must be deposited on the surface of A.

D is the belt pulley by which the whole drum containing the bath is caused to turn or oscillate on its bearings.

On the rings E and F are placed the brushes for the electric current; the current enters the apparatus through the ring E, passes through the anodes C, C and through the liquid of the bath, reaches the surface of the mold A, and from this, by means of one or more conducting wires, goes to the ring F and consequently to the second brush upon the circuit being closed.

The journals may be constructed hollow, in order to permit the renewal of the liquid if the bath during the electro-deposition process, if required.

The form of the vessel or drum, as well as that of the anodes, may be of course very different, according to the form of the mold A, though it is preferred to make it of prismatic form, and various modifications may be made in the construction of the apparatus without exceeding the scope of the invention.

Referring to Figs. 4–6 inclusive and particularly to Fig. 4, wherein a small multitubular boiler is represented as being operated upon; the burnishing bodies B' B' connected in series work together with the loose bodies B, B like those of Fig. 1, and are employed especially to help the electro-deposition of a compact layer of metal on the surface of its internal tubes T, T, where the said loose burnishing bodies could not have as efficient an action as on the other parts of the surface of the mold A. The said bodies B', B' are strung in suitable number on metal wires W, W arranged between the two bottoms of the vessel in which the electro-deposition is carried on. The metal wires W, W are preferably of the same material as the anode plates C, C, in order to aid the electro-deposition on the surfaces of the said internal tubes of the boiler. The Fig. 4 shows also the manner in which the mold A is maintained in a fixed position inside the vessel, by means of a rod S, one end of which is screwed to the body of the mold, and the other end to the wall V of the vessel. The said Figs. 4 to 6 illustrate a way of using the burnishing bodies connected in series, but it will be understood that other similar connections may be employed without departing from the scope of the invention.

What I claim is:—

1. A process of electro-deposition in which metal is electrolytically deposited on a suitable object and the deposited metal at the same time subjected to the hammering action of a multiplicity of loose, relatively heavy small non-conducting bodies having rounded edges.

2. A process of electro-deposition in which metal is electrolytically deposited upon a suitable object, and the deposited metal during the process of deposition subjected to the hammering action of a multiplicity of loose, small relatively heavy bodies having rounded edges.

3. A process of electro-deposition in which metal is electrolytically deposited upon a suitable object, and the deposited metal during the process of deposition subjected to the hammering action of a multiplicity of loose, small, relatively heavy, non-conducting bodies having rounded edges.

4. In an apparatus for the electro-deposition of metals, the combination of a receptacle for an electrolyte and for an object upon which the metal is to be deposited, an electrolyte, means for producing an electric current through said electrolyte, a multiplicity of loose, small, relatively heavy bodies in said receptacle and means for projecting said bodies having rounded edges against the body upon which the metal is to be deposited, whereby said bodies strike said body being coated hammering blows.

5. In an apparatus for the electro-deposition of metals, the combination of a receptacle for an electrolyte and for an object upon which the metal is to be deposited, an electrolyte, means for producing an electric current through said electrolyte, a multiplicity of loose, small, relatively heavy, non-conducting bodies having rounded edges in said receptacle and means for projecting said bodies against the body upon which the metal is to be deposited, whereby said bodies strike said body being coated hammering blows.

6. In an apparatus for the electro-deposition of metals, the combination of a receptacle for an electrolyte and for an object upon which the metal is to be deposited, an electrolyte, means for producing an electric current through said electrolyte, a multiplicity of loose, small, relatively heavy bodies in said receptacle and means for agitating said receptacle, whereby said bodies having rounded edges are projected against said body upon which metal is to be deposited so as to hammer and harden the deposited metal.

7. In an apparatus for the electro-deposition of metals, the combination of a receptacle for an electrolyte and for an object upon which the metal is to be deposited, an electrolyte, means for producing an electric current through said electrolyte, a multiplicity of loose, small, relatively heavy, non-conducting bodies in said receptacle and means for agitating said receptacle whereby said bodies having rounded edges are projected against said body upon which metal is to be deposited so as to hammer and harden the deposited metal.

8. In an apparatus for the electro-deposition of metals, the combination of a receptacle, for an electrolyte and for an object upon which the metal is to be deposited, adapted to be vibrated, an electrolyte, means for producing an electric current through said electrolyte, and a multiplicity of loose, small, relatively heavy bodies in said receptacle adapted to be projected against the object upon which metal is to be deposited upon vibration of the receptacle, whereby the deposited metal is hammered and hardened.

9. In an apparatus for the electro-deposition of metals, the combination of a receptacle of prismatic form for an electrolyte and for an object upon which the metal is to be deposited, an electrolyte, means for producing an electric current through said electrolyte and a multiplicity of loose, small, relatively heavy bodies in said receptacle, said receptacle being pivotally mounted, whereby rotation of said receptable causes said small bodies to be projected in substantially straight trajectories against an object to be coated fixed upon the interior of said receptacle so as to produce an active hammering upon the surface of said object by the bombardment of said loose bodies put in motion by the rotation of said receptacle.

10. In an apparatus for the electro-deposition of metals, the combination of a receptacle for an electrolyte and for an object upon which the metal is to be deposited, an electrolyte, means for producing an electric current through said electrolyte and a multiplicity of loose, small, relatively heavy bodies in said receptacle, said receptacle being pivotally mounted upon hollow trunnions, whereby the electrolyte can be circulated through said receptacle, and whereby rotation of said receptacle causes said small bodies to be projected in substantially straight trajectories against an object to be coated fixed upon the interior of said receptacle so as to produce an active hammering upon the surface of said object by the bombardment of said loose bodies put in motion by the rotation of said receptacle.

11. In an apparatus for the electro-deposition of metals, the combination of a receptacle of prismatic form for an electrolyte and for an object upon which the metal is to be deposited, an electrolyte, means for producing an electric current through said electrolyte, and a multiplicity of loose, small bodies in said receptacle, said bodies being hard, of appreciable size and weight, dense, rounded, and non-conducting, said receptacle being pivotally mounted, whereby rotation of said receptacle causes said small bodies to be projected in substantially straight trajectories against an object to be coated fixed upon the interior of said receptacle so as to produce an active hammering upon the surface of said object by the bombardment of said loose bodies put in motion by the rotation of said receptacle.

In witness whereof, I have hereunto signed my name in the presence of two subscribing witnesses.

STEFANO CONSIGLIERE.

Witnesses:
GIORAMER CAILERE,
BITHIN BETE.

---

Copies of this patent may be obtained for five cents each, by addressing the "Commissioner of Patents, Washington, D. C."